United States Patent [19]

Vackier et al.

[11] 4,281,805
[45] Aug. 4, 1981

[54] APPARATUS AND METHOD FOR COILING A MOVING WEB

[75] Inventors: Leo N. Vackier, 's-Gravenwezel; Lucien P. van der Vliet, Hoboken, both of Belgium

[73] Assignee: Agfa-Gevaert N.V., Mortsel, Belgium

[21] Appl. No.: 94,353

[22] Filed: Nov. 14, 1979

[30] Foreign Application Priority Data

Nov. 17, 1978 [GB] United Kingdom ............... 44937/78

[51] Int. Cl.³ ........................................... B65H 27/00
[52] U.S. Cl. .................................................... 242/76
[58] Field of Search ..................... 242/76, 74, 67.1 R

[56] References Cited

U.S. PATENT DOCUMENTS

| 1,871,715 | 8/1932 | May | 242/76 |
|---|---|---|---|
| 3,395,870 | 8/1968 | Klinger | 242/76 X |
| 3,698,654 | 10/1972 | Rosenburgh | 242/74 |
| 4,136,839 | 1/1979 | Walter | 242/76 |

*Primary Examiner*—Edward J. McCarthy
*Attorney, Agent, or Firm*—William J. Daniel

[57] ABSTRACT

A self-threading spool or core for a moving web or strip in which the web or strip is guided onto the periphery of a supported frame for rotation about a horizontal axis by freely flexible guide means anchored at one end to the frame and extending from said anchored end generally tangentially to the underside of the core periphery and then up and over said periphery to be held by gravity in partially encircling contact therewith or with the web being wound, the guide means defines with the periphery of said core a nip into which the leading edge of a web travelling between the core and flexible means is directed into winding engagement with the core. When a sufficient number of coils has been collected on the core, the flexible means slides free of the core to an out-of-the-way position beneath the core.

13 Claims, 7 Drawing Figures

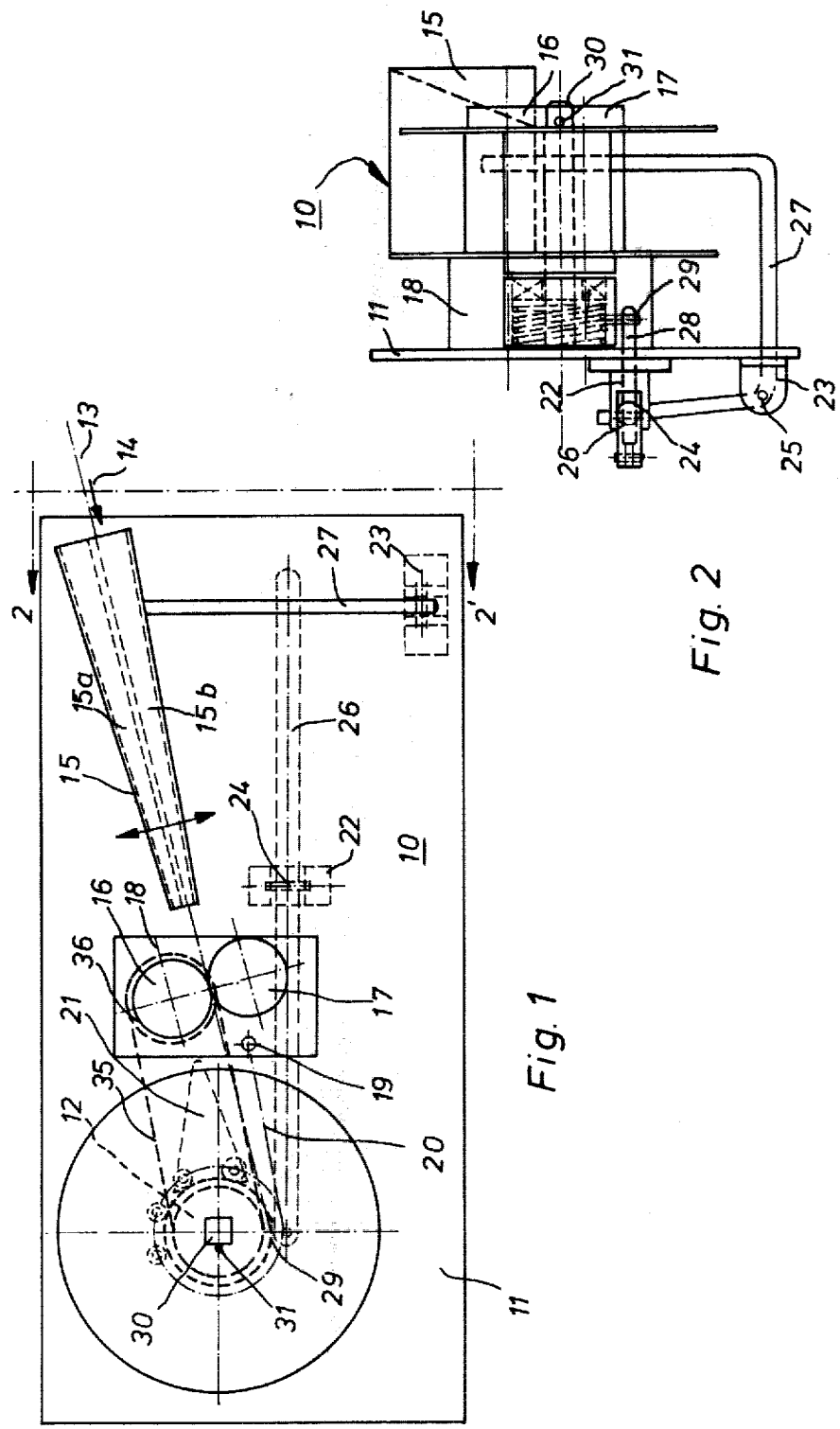

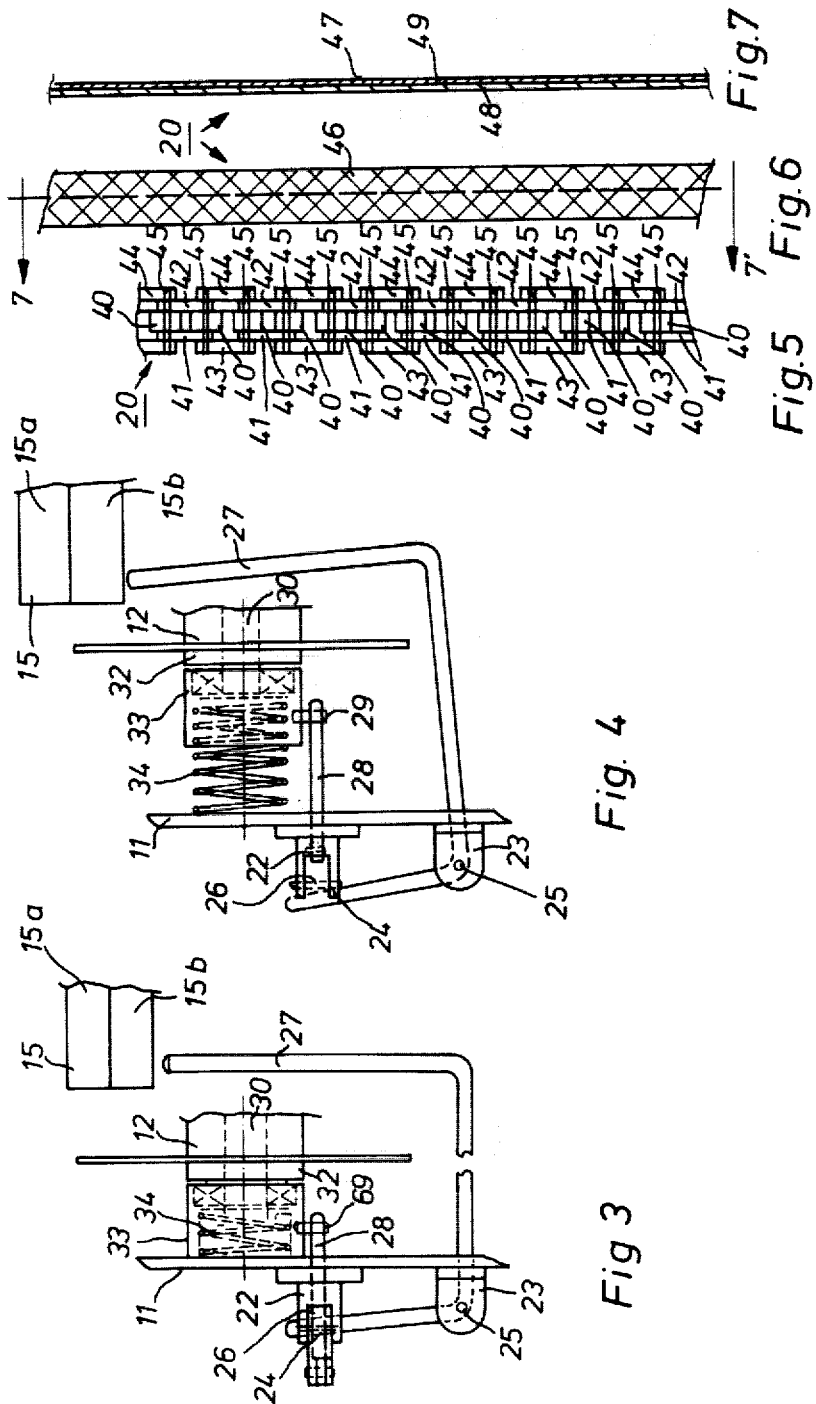

APPARATUS AND METHOD FOR COILING A MOVING WEB

This invention is concerned with web-coiling, and more particularly with an apparatus and method for automatically threading and coiling a moving strip or web onto a core or spindles.

The invention is primarily concerned with the coiling of microfilms and analogous materials onto a core, although the principle of the invention is not limited to that particular field of application.

Up to now, the threading of a strip or web onto a winding core or spindle was relatively complicated, especially for the small width webs. One of the reasons therefore was that the leading edge had to be threaded and fixed into a narrow slot provided in the core in order to guarantee a faultfree starting of the winding operation.

The introduction of the leading edge of the strip or web into the slot in question, especially when the core is provided with side-flanges, requires a considerable amount of skill and dexterity on the part of the operator. Moreover, the shape and width of said slot may differ according to of the manufacturer of the core.

It is therefore an object of the invention to provide a simple mechanism and method by means of which the threading of a strip or web onto a winding core may be carried out automatically even in the absence of the slot in the core.

According to the invention, there is provided: a device for coiling a moving strip or web onto a core which device comprises a frame, means carried by said frame upon which said core may be positioned for rotation, means to impart rotation to said core, flexible means having one end secured to said frame and extending therefrom beneath and around said core to partly embrace the same in an up-and-over configuration so that the leading edge of a web travelling between the core and the flexible means is directed towards the nip defined between the core and the flexible means as winding continues.

A device as defined hereinbefore is capable of initiating winding of a strip or web without the necessity of putting the leading edge into a slot in the core. It is thus of prime utility for the automatic coiling of motion picture films, amateur cine films or microfilms. Automatic coiling devices according to the invention may thus be of interest when located at the exit of automatic processing machines. It will also be clear that the presence of supplementary side-flanges at the core poses no problems and that the device can be used for both kinds of cores. Therefore, the term "core" covers as well cores with and without side flanges.

In order to promote a faultfree coiling cycle, the frictional characteristics of the materials involved preferably show a well defined relationship. Thus, the frictional coefficient of the surface of the flexible means facing the strip or web will be less than that of the surface of the strip or web facing the core. In this way, relative slipping between the web and the core is greatly reduced and may even be eliminated.

The flexible means may take the form of either a ribbon or a chain. In the former case, a ribbon will have sufficient mechanical strength and in order to reduce the friction between the strip or web and the surface of the flexible means facing it, its surface will be provided with a friction reducing layer or coating. Polytetrafluoroethylene (sold under the tradename TEFLON) has revealed itself as being very well suited for the purpose.

In the case the flexible means is in the form of a chain, the elements forming the latter will be interconnected by small roller bearings so that sliding friction is completely avoided and replaced by rolling friction, enabling very low frictional coefficients to be realized.

In a preferred embodiment of the device according to the invention, one end of the flexible means is attached to the frame, whereas the remainder of it loosely hangs over part of the periphery of said core in an up-and-over configuration. At the end of the residual part a kind of counterweight is provided in order to prevent backsliding of the flexible means when positioned over the core. The counterweight may be shaped so that its face, directed towards the core, shows a nearly concentric relation with the latter. After the strip or web has performed one convolution, the leading edge becomes caught in the nip between the advancing web and the core and the winding-up cycle can start. After a few convolutions are wound upon the core, the flexible member slides off the core and the winding cycle can be further completed without additional expedients.

It will be clear that at the start of the winding cycle the peripheral speed of the core may be equal to or greater than the speed of the web to be coiled. In the latter case the core is driven via a slip clutch which assures that a good tensioning of the strip or web is obtained. The driving force for rotating the core may be furnished by an associated motor, although for reasons of convenience it may be preferred to drive the core via the master motor of the apparatus to which the device according to the invention is coupled.

The device may be completed in a practical embodiment by providing separate driving means and supplementary guide means in order to increase its reproducibility and its convenience. So the guide means—in case a microfilm has to be coiled for example—may be divided in sub-guides, depending upon the width of the web, say 16 or 35 millimeters, which sub-guides may be brought in operational relationship by the action of simply putting another core on the core bearing member.

The invention also includes a method for coiling a moving strip or web onto a core comprising the steps of rotating said core at a predetermined rotational speed, providing flexible means around at least part of the periphery of said core in an up-and-over configuration, at least one end of said flexible means being so arranged as to form a nip with said core and feeding the leading edge of said moving strip or web into said nip while rotating said core at said predetermined speed in the direction of feeding.

The scope and spirit of the invention will become clear in the light of the description of a preferred embodiment with reference to the drawings in which:

FIG. 1 is a side view of the device according to the invention,

FIG. 2 is a view of the device of FIG. 1, when seen in the direction of arrows 2—2', FIG. 3 shows a partly sectional view of the core bearing member of the device of FIGS. 1 and 2, FIG. 4 shows the core bearing member of FIG. 3 in the position for receiving another width of the strip or web to be coiled, FIG. 5 shows a top view of the flexible means in the form of a chain, FIG. 6 shows a top view of the flexible means in the form of a ribbon and FIG. 7 gives a sectional view of another embodiment of the ribbon of FIG. 6.

As illustrated in FIGS. 1 and 2, a web-coiling device 10, according to the invention, comprises a frame 11 on which the constituent parts of the device and the core 12 may be located.

A web 13 to be coiled, such as a microfilm, professional motion picture film, a S8-amateur cine film or other strip or web-like material is fed towards the device in the direction of the arrow 14 and is guided via guide member 15 and a pair of transport rollers 16, 17 towards the core 12. Guide member 15 itself is composed of sub-guides 15a and 15b depending upon the width of the web. It will be clear that the guide 15 need not necessarily have a rather complicated structure as herein illustrated but may be drastically simplified or even omitted, depending upon the stiffness of the web material which is to be handled.

The transport rollers 16 and 17 may be omitted when a positive driving force is exerted on the strip as when the latter is fed via the exit roller pair of a processing machine for example. The transport rollers 16 and 17 are rotatably mounted on a small support 18 which also bears a small anchoring bar 19 to which is attached one end of a flexible ribbon or chain 20 whose other end bears a counterweight 21 serving the purpose of keeping the chain or ribbon 20 in a tensioned condition so that it does not slide back off the core 12. The material of claim 20 facing the core 12 is indeed so chosen that it shows a very low coefficient of friction versus the materials which it has to contact, be it the web or strip to be coiled or the core upon which the coiling is carried out.

It will be clear to someone skilled in the art, that the chain or ribbon 20 need not necessarily remain upon the core 12 when the diameter of the latter increases due to the increasing number of convolutions which are wound on it. Therefore, after initiating the winding cycle, when all conditions for a good coiling are fulfilled, and the guiding function of the ribbon or chain 20 is no longer required, it slides from the peripheral face of the already wound portion of the roll.

In the further course of the description the flexible means referred to comprise only one ribbon or chain 20 because it is assumed that the device has to treat only 16 or 35 mm microfilm. It is, however, within the scope of the invention that more than one chain or ribbon 20 may be used when microfilms of 70 mm, 105 mm and even larger ones are to be coiled.

On the frame 11 are also mounted supports 22 and 23. Support 22 bears a spindle 24 around which lever 26 may pivot while support 25 carries a spindle 25 around which lever 27 is pivotable.

Lever 26 is attached to a small bar 28 resiliently biased on the core bearing mechanism via spindle 29 which undergoes a displacement which is axially aligned with the shaft 30 on which the core 12 is slid and fixed with the help of a retractable, resiliently biased pin 31 preventing the core from sliding off the shaft.

When lever 26 is pivoted, it transmits its pivotal movement to lever 27 which cants around spindle 25, thereby pushing guide 15 in upward direction or, in the reverse case, permitting guide 15 to assume its lower position under the force of gravity. In this way, depending upon the width of the core 12 the guide 15 assumes a position which guarantees an optimum feeding of web 13 towards the nip formed by the core 12 and the flexible chain or ribbon 20.

Details about the width controlling mechanism of the web coiling device 20 are explained hereinafter with reference to FIGS. 3 and 4.

As may be derived from FIGS. 3 and 4, the core 12, apart from being mounted on shaft 30, rests against a collar 32 which itself is rotatably mounted in a bushing resiliently biased on shaft 30 and against frame 11 by means of a spring 34.

In the situation as illustrated in FIG. 3, it is assumed that a core 12 intended for coiling 35 mm film is placed on the shaft 30. This causes bushing 33 to take its outermost position and the spring 34 to become compressed at its maximum. As a consequence, the spindle 29 housed in bushing 33 pushes bar 28 to the extreme left, thereby conferring a position to levers 26 and 27 as illustrated. The right upstanding part of lever 27 is nearly vertical, so that its top urges against guide 15 and is in fully depressed position. This corresponds with a feeding of the web or strip through sub-guide 15a (see FIG. 1).

In FIG. 4 the situation is illustrated when a 16 mm core is placed on shaft 30. In this position spring 34 is less compressed than in the preceding situation because the collar 32 and the bushing 33 are not in their extreme position when compared to FIG. 3. As a consequence, lever 26 is canted over only a small angle so that the top at lever 27 does not reach its fully depressed position. This configuration results in that guide 15 is in a more upward direction causing the right guide through which the film is fed to point towards the nip between the flexible means 20 and the core 12. The core may be rotatably driven either directly by means of a motor (not shown) or by means of an endless belt 35 (see FIG. 1) going from a drive wheel 36 mounted on a pulley on one of the rollers 16 and 17, one of these rollers being driven. Rather than with the help of the motor, driving may be realized by a transmission mechanism which is linked with the drive mechanism to which the web-coiling device of this invention is coupled. In the latter case, the exact synchronisation can be easier achieved between the web speed of the preceding device or the one according to the invention.

Finally, in FIGS. 5 to 7 are shown different embodiments of the flexible means 20 used in the device of the invention. So, FIG. 5 shows a flexible means 20 in the form of a chain. It is built-up of a plurality of small bearings 40 which are linked together by adjacently positioned chain elements 41 and extend 42 and elements 43 and 44. The adjacently positioned elements 41 and 42 are hingedly connected with the elements 43 and 44 by means of a plurality of spindles 45 going through the center of the small bearings 40. Due to the small dimensions of the elements constituting the chain 20, small radii of curvature (for example the periphery of a 16 mm spool) may be realized.

In FIG. 6 a flexible means 20 is shown in the form of a freely flexible ribbon. It comprises a ribbon 46 which is made of a fibrous or non-woven material impregnated with a friction reducing composition to keep the coefficient of friction between it and a web material (not shown) to be transported very low so that friction marks or other artefacts on said material may be avoided.

Alternatively, as shown in FIG. 7, a two layer material 47 may be used. One of the layers 48 may be made of any desired flexible and mechanically strong material such as a polymer material, whereas the other layer 49 may be made of a friction reducing material such as polytetrafluoroethylene (sold under the trade-name TEFLON). The layer 49 may be either in the form of a material layer which is secured in some way or other to layer 48, such as by sealing or glueing techniques or in the form of a coating applied to the first layer.

The device of the invention is most suited for forming part of a microfilm processing system, although it is not limited thereto. By changing dimensions it may be converted into a coiling device for webs in general.

We claim:

1. A device for coiling a moving web or strip onto a rotating core, which device comprises a frame, core support means carried by said frame upon which said core may be positioned for rotation about a horizontal axis, means for imparting rotation to said supported core, freely flexible means anchored at one end to said frame, said flexible means extending from said anchored end generally tangentially to the underside of the core periphery and then up and over said periphery to be held by gravity in partially encircling contact therewith or with the web being wound, thereby defining with the periphery of said core a nip into which the leading edge of a web travelling between said core and said flexible means is directed for winding engagement with said core.

2. A device according to claim 1, in which the frictional coefficient of at least one surface of said flexible means facing said core relative to said strip or web is smaller than that of said strip or web relative to said core.

3. A device according to claim 1, in which said flexible means is in the form of a chain, said chain comprising bearings for contacting the strip or web.

4. A device according to claim 1, in which said flexible means is in the form of a ribbon.

5. A device according to claim 4, in which only the surface of said ribbon facing said strip or web is of a material having a frictional coefficient relative to said web or strip which is lower than that of said core relative to said web or strip.

6. A device according to claim 2, in which at least those portions of said flexible means which are arranged in use to contact said strip or web are made from a material comprising polytetrafluoroethylene.

7. A device according to claim 1, in which the unanchored end of said flexible means carries a counterweight.

8. A device according to claim 1, in which the length of said flexible means is such as to embrace the core only at the beginning of the coiling cycle, and is dislodged from the web or strip after the coiling cycle is initiated and a sufficient number of convolutions of said web or strip are wound upon said core.

9. A device according to claim 1, in which means is provided to advance said strip or web towards said nip.

10. A device according to claim 1, in which guide means is provided to guide said strip or web towards said nip.

11. A device according to claim 10, in which said guide means is divided into sub-guides depending upon the width of the web or strip to be coiled.

12. A device according to claim 11, in which a corresponding sub-guide is brought in guiding position in response to the width of the core which is to be coiled.

13. A device according to claim 12, in which the exit of said sub-guides points towards said nip.

* * * * *